Dec. 6, 1938.   F. W. ATZ, JR   2,139,482
ELECTRICAL CONTROL SYSTEM
Filed Jan. 4, 1937   5 Sheets-Sheet 1

Dec. 6, 1938.  F. W. ATZ, JR  2,139,482
ELECTRICAL CONTROL SYSTEM
Filed Jan. 4, 1937  5 Sheets-Sheet 2

Inventor
Frederick W. Atz Jr.
By Cornelius D. Ehret
Attorney

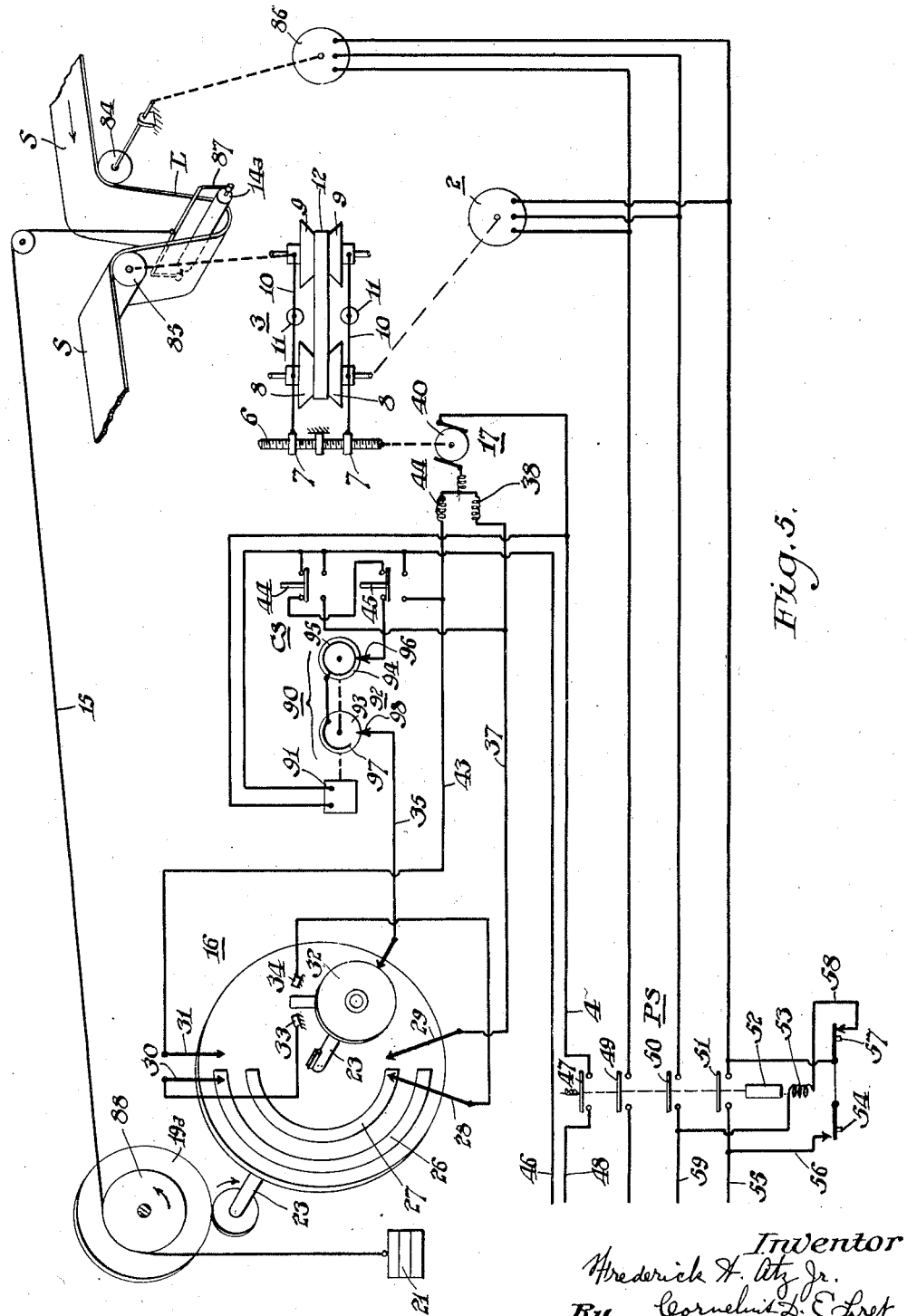

Dec. 6, 1938.  F. W. ATZ, JR  2,139,482
ELECTRICAL CONTROL SYSTEM
Filed Jan. 4, 1937  5 Sheets-Sheet 4
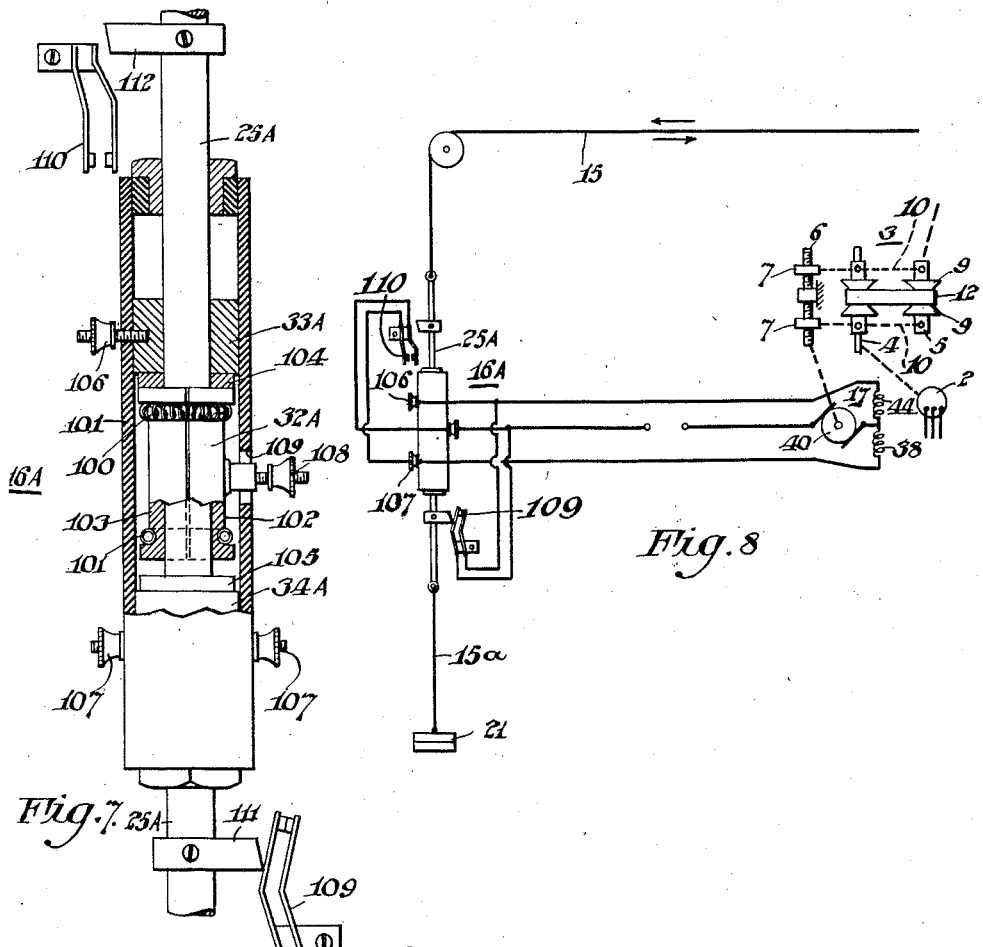
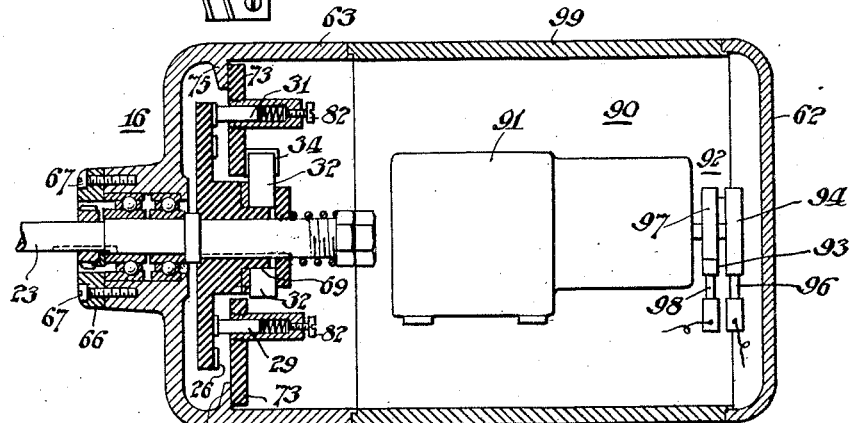
Inventor
Frederick W. Atz Jr.
By Cornelius D. Ehret
Attorney.

Patented Dec. 6, 1938

2,139,482

UNITED STATES PATENT OFFICE 2,139,482

ELECTRICAL CONTROL SYSTEM

Frederick W. Atz, Jr., Philadelphia, Pa., assignor to Link-Belt Company, Chicago, Ill., a corporation of Illinois Application January 4, 1937, Serial No. 118,969

17 Claims. (Cl. 74—230.17)

My invention relates to control systems and particularly to an electrical control system for varying, in response to movement of a detector element, the speed ratio between a driving member operating at constant or predetermined speed and a member driven thereby.

In accordance with one aspect of my invention, the speed radio between the driving and driven members is varied, in response to movement of the detector element from a neutral or predetermined position, until the detector element begins to reverse its movement, and the speed ratio is not thereafter changed in a reverse sense until the detector element moves beyond the neutral position.

In some modifications of the invention, the control action is of the aforesaid character so long as the departure of the detector element from neutral does not exceed a predetermined magnitude, and for larger departures of the detector from neutral position, the speed radio is continuously changed in one direction or the other, depending upon the sense of displacement of the detector from neutral position, regardless of whether its movement is toward or away from neutral position.

In some modifications of my invention, there is provided the additional feature that the rate at which the speed ratio is changed is varied as a function of the displacement of the detector element from neutral.

More particularly, and in preferred forms of my invention, the operation of a reversible pilot motor for varying the speed ratio between the driving and driven members is controlled by a reversing switch whose reversal limits are in effect varied as a function of the displacement detector element from neutral; specifically, the reversal range is small for small departures of the detector element from neutral and increases for larger departures.

More particularly, the control switch for the pilot motor comprises contact structure whose movement is substantially proportional to the movement of the detector element, and other contact structure, having a fixed or limited range of movement, whose position depends upon the direction of movement of the detector element.

My invention further resides in the methods and in the systems having the novel features of combination, construction and arrangement, hereinafter described and claimed.

For an understanding of my invention and for illustration of various forms thereof, reference is to be had to the accompanying drawings in which:

Fig. 1 diagrammatically illustrates a pump control system;

Fig. 2, in cross-section, discloses a control switch schematically shown in Fig. 1;

Fig. 5 illustrates a system in which the invention is utilized to control feeding of a web or strip;

Fig. 6 is a detail view in cross-section of circuit controlling devices schematically shown in Fig. 5;

Fig. 7, partly in section and with parts broken away, illustrates a modified form of control switch;

Fig. 8 illustrates, in part, a control system utilizing the switch of Fig. 7;

Figs. 9-12 illustrate further control switch modifications.

Figure 1:
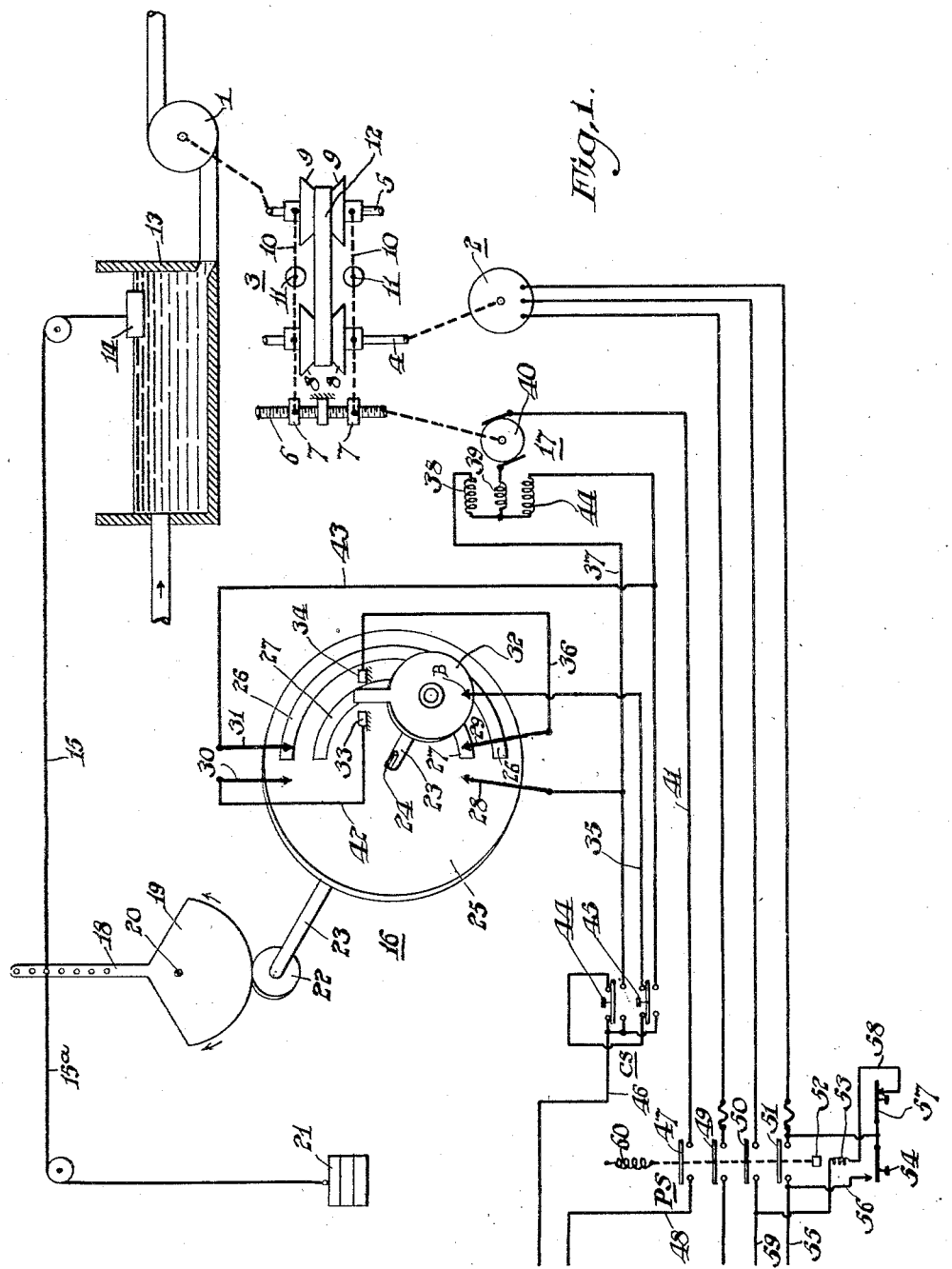

Referring to Fig. 1, the pump 1 is driven from a prime mover, such as electric motor 2, through a variable speed transmission 3, preferably of the type disclosed in U. S. Letters Patent #1,601,662. The ratio of the speed of shaft 4 of the variable speed transmission to driven shaft 5 is adjustable by the control screw 6. For purposes of explanation, it is assumed that when screw 6 is rotated in clockwise direction the nuts 7, 7 move away from one another to increase the separation between the driving cones 8, 8 slidably keyed to the constant speed shaft 4 and to decrease the separation between the driven cones 9, 9 slidably keyed to the variable speed shaft 5 thus to change the effective diameters of the cones. The mechanical linkage between the cones and the adjusting nuts is diagrammatically represented by the dotted lines 10 indicative of levers pivoted at points 11. Power is transmitted from the driving cones to the driven cones by the chain 12 or equivalent.

In the particular system shown in Fig. 1, the pump 1 is for feeding sewage from the settling tank 13 to a treating tank or reservoir, not shown. In systems of this type, it is desirable that the level of the liquid in the tank 13 be maintained substantially constant, at least within certain limits. To that end, the float 14, supported by the liquid within tank 13, is connected, as by cord 15 or equivalent, to a control switch 16 which controls the operation of a pilot motor 17 suitably connected to the control screw 6 of the variable speed transmission.

In the specific arrangement shown, the cord 15 is connected to an arm 18 extending from a gear sector 19, or equivalent, pivotally mounted on axis 20. Preferably, as indicated, an extension 15a of the cord is connected to a counterweight 21. The ratio of the movement of the float 14 to the movement of shaft 23 may be varied by adjusting the effective length of lever arm 18; specifically, arm 18 has a series of holes differing in distance from the axis of shaft 23 and to one of which cord 15 may be selectively connected.

As the float 14 rises and falls within the tank 13, the gear sector 19 rotates in counterclockwise or clockwise direction from the position shown which, for purposes of explanation, is assumed to be the neutral position corresponding to the desired level of liquid within tank 13. The gear sector 19 is in mesh with the gear 22 secured to shaft 23 to which is suitably secured, as by key 24, the disk 25, which carries two concentric contact members 26, 27.

Figures 2, 3:
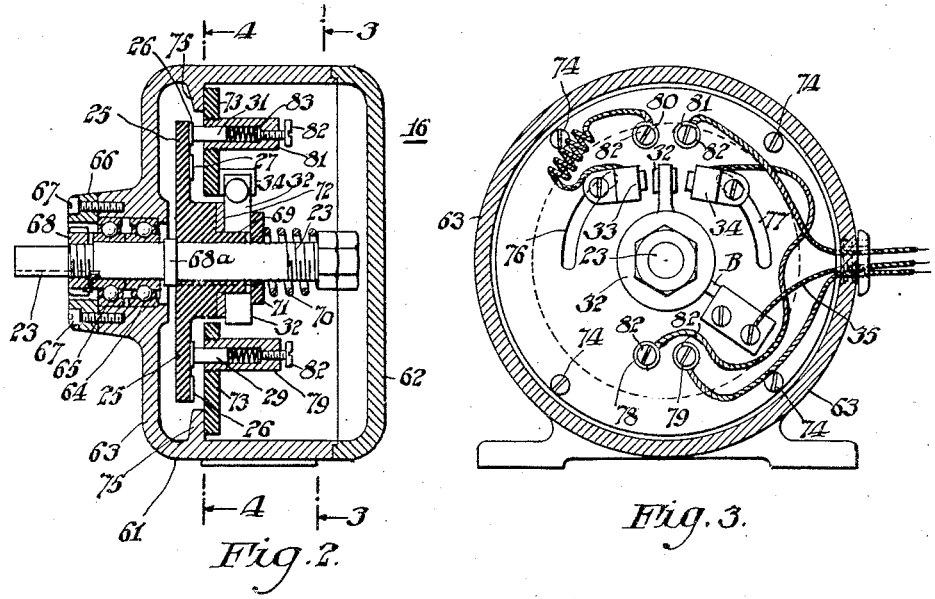
Fig. 3 is a cross-section taken on line 3—3 of Fig. 2.

As shaft 23 is rotated in clockwise direction from the "neutral" position shown in Fig. 1, the inner sector 27 is adapted to bridge the brushes or contacts 28, 29, and for counterclockwise rotation of shaft 23 from neutral, the outer sector 26 bridges the contacts or brushes 30, 31. The movable contact member 32 frictionally held to shaft 23 is adapted to engage one or the other of the fixed butt contacts 33, 34, depending upon the direction of rotation of shaft 23 from the neutral position shown. Contact 32 is connected to conductor 35 by a flexible lead or by a brush B, as shown in Fig. 3. Preferably, the spacing between the fixed contacts 33, 34 and the movable contact 32 is rather small so that engagement between the movable contact 32 and one or the other of contacts 33, 34 results from small movement of shaft 23. When the movement of the shaft in either direction is in excess of that effecting engagement between contact 32 and one or the other of the butt contacts, the shaft 23 continues to move but contact 32, because of its engagement with contact 33 or 34, slips with respect to the shaft. The details of construction of the control switch will be hereinafter more fully explained in connection with the description of Figs. 2 to 4.

It is assumed the level in tank 13 has risen causing float 14 to effect rotation of shaft 23 in clockwise direction from the neutral position shown in Fig. 1. In consequence, the contacts 28, 29 are bridged by the conductive segment 27 on disk 25, and contact 32 is in engagement with contact 34 and, assuming the switches PS and CS to be closed, this completes a circuit from conductor 35 connected to one side of a supply line, through contacts 32, 34 of the control switch, conductor 36, brushes 28, 29 and sector 27 of the control switch, conductor 37, field 38 of motor 17, compensating field 39 and armature 40 of motor 17, to conductor 41 connected to the other side of the line. This effects energization of motor 17 for rotation in proper direction to change the setting of the control screw of the variable speed transmission in proper sense to increase the speed of pump 1. So long as float 14 is rising, engagement between the contacts 32 and 34 is maintained to effect a progressive change in the speed ratio of the driving to the driven shafts of the variable speed transmission. When float 14 begins to reverse its movement, the contact 32 moves away from contact 34 to effect deenergization of the motor 17, even though disk 25 is more or less displaced in clockwise direction from its neutral position, shown in Fig. 1. The speed ratio thereupon remains fixed at the value giving the higher speed of pump 1 necessary to check the upward movement of the float. If, notwithstanding the increased speed, the float again begins to rise, contact 32 again moves into engagement with 34 to effect operation of control motor 17 for further change of the speed ratio in the same sense as before, and again the speed ratio is progressively changed until the movement of the float is checked and it begins to move in a reverse direction, whereupon the control motor is promptly deenergized. In either case, the control system may come to rest with the float 14 and disk 25 displaced from their neutral positions shown in Fig. 1. If conditions are such the float remains stationary at the new speed of shaft 5 of the variable speed transmission, the control system remains at rest with the float and control disk away from their normal or neutral positions. If, however, the change in speed of the pump 1 is greater than necessary to meet the new conditions, the float 14 will fall, causing a reverse rotation of shaft 23 and effecting engagement between contact 32 and the fixed contact 33 of the control switch. However, this engagement of contacts 32 and 33 does not complete a circuit to effect reverse operation of motor 17 because, with disk 25 in its displaced condition from neutral, the contact segment 26 is out of bridging engagement with the contacts 30 and 31. When, however, the float passes beyond its neutral position of Fig. 1, moving away from neutral position in the opposite direction from heretofore, the contact segment 26 bridges the contacts 30, 31 to complete a circuit through motor 17 which is traced as follows: from conductor 35 through contacts 32, 33, conductor 42, brush 30, contact segment 26, brush 31, conductor 43, motor field 44, compensating field 39, armature 40, and conductor 41 connected to the other side of the line. The motor 17 is thus energized for rotation in reverse or clockwise direction to change, in opposite sense, the ratio of the speed of constant speed shaft 4 to shaft 5 of the variable speed transmission 3. The speed of the pump is thus decreased, and continues to decrease because of continued energization of the control motor 17 until downward movement of the float is checked and it begins to rise. Thereupon, shaft 23 rotates in clockwise direction to effect separation of contacts 32, 33 and interruption of the power circuit for the control motor 17, even though at that time disk 25 is displaced to substantial extent in counterclockwise direction from its neutral position shown in Fig. 1.

So long as disk 25 is displaced in this direction from its neutral position, the control motor 17 can be energized only when the float rises; it cannot be energized in sense to increase the speed ratio between the driving and driven shafts of the variable speed transmission because, so long as the control disk is displaced from neutral position, the brushes 28, 29 of the control switch cannot be bridged by the sector 27.

From the foregoing description, it is apparent that when the float is at or near its neutral position, movement of the float in opposite directions within a narrow range is sufficient to effect reversals of the control motor 17; whereas, for large departure of the float from neutral position there is a correspondingly increased range in which the float may move in opposite directions without effecting a reversal of the control motor 17. In consequence, the control system is sensitive to small changes in the position of the float, or detector element for movement away from the neutral position, and yet possesses the characteristic of great stability, or absence of hunting or overshooting.

In the system shown in Fig. 1, the push-buttons 44 and 45 of control switch CS are provided to permit manual control of motor 17 for adjustment of the speed conversion effected by the variable speed transmission 3. When push-button 44 is depressed from the position shown, it completes a circuit, independently of the automatic control switch 16, through the field 39 of the motor to effect its rotation in direction to increase the speed conversion ratio, and when push-button 45 is depressed from the position shown, it completes a circuit through the field 44 of the motor 17 to effect its operation in reverse direction for decreasing the speed conversion ratio. The push-buttons 44 and 45 are suitably biased to the positions shown in Fig. 1 and the connections are such the push-button or manual control takes precedence over the operation of automatic control switch 16 to prevent conflicting requirements from being imposed on motor 17; specifically, when either push-button 44 or 45 is depressed, it interrupts the circuit from the supply line 46 to conductor 35 of the automatic control switch 16 which is common to the two control circuits capable of being established through the switch 16.

It is, of course, not necessary the control motor 17 be energized from a source separate from that supplying motor 2, nor is it necessary that motor 2 be energized from a three-phase source, as indicated. The source of supply for the control or power apparatus may be alternating or direct.

Preferably, and as appears in Fig. 1, the switches for connecting the motors 2 and 17 to a source of power are interlocked, so that whenever motor 2 is effective to drive the variable speed transmission, the control screw 6 of the variable speed transmission is subject to control by motor 17. Specifically, the contact 47 for connecting the conductor 41 to supply line conductor 48 is movable with contacts 49, 50 and 51, suitably mechanically connected to the core or armature member 52 of the magnet or solenoid 53. To effect movement of these contacts from the position shown in Fig. 1 to their closed circuit position, push-button 54 is moved from the open circuit position, to which it is normally biased, momentarily to complete a circuit from line conductor 55, through conductor 56, push-button 54, normally closed switch or push-button 57, conductor 58, and solenoid 53 to line conductor 59. Movement of contact 51 to its closed circuit position not only completes the circuit of one of the line conductors of motor 2, but also completes a circuit in shunt to the push-button 54 to maintain the energization of the solenoid or magnet 53 when the push-button 54 is released.

To deenergize the power and control circuits, push-button or switch 57 is moved from its normal or closed circuit position to interrupt the circuit of solenoid 53; the spring 60 or equivalent biasing means is thereupon effective to move the power contacts 49—51 and the control circuit contact 47 to their open-circuit positions.

If desired, limit switches may be provided to interrupt the circuit of control motor 17 when nuts 7 reach either limit of their range of adjustment to preclude further movement in the same direction.

Figure 4:
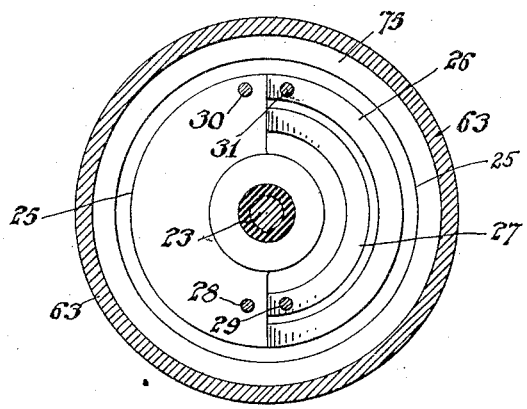
Fig. 4 is a cross-section taken on line 4—4 of Fig. 2.

The preferred construction for the automatic control switch 16 is shown in detail in Figs. 2, 3 and 4. The switch housing 61 comprises a cover 62 and a main or body member 63. The shaft 23, operable by a suitable detector element, as float 14 of Fig. 1, is supported within the housing 61 by the ball bearings 64, 65 retained in place by the cap 66 through which pass the screws 67. Lateral movement of the shaft is restrained by the thrust-bearing 68, screwed onto a threaded portion of shaft 23, and the flange 68a. The disk 25 which carries the contact segments 26, 27 is provided with an extension 69 of reduced diameter which is received by the contact member 32. (Fig. 2).

A slip clutch which provides for movement of contact 32 with shaft 23 until contact member 32 engages one or the other of the fixed contacts 33, 34, comprises the spring 70 and the clutch plates 71, 72 disposed on opposite sides of member 32. The disk 73, of insulating material, held by screws 74 to the flange 75 or equivalent, interiorly of the housing, is provided with arcuate slots 76, 77 to permit adjustment of contacts 33 and 34. The disk 73 also threadably receives the posts 78, 79, 80 and 81 for supporting the control brushes 28, 29, 30 and 31; the posts are hollow and each is provided with an adjustable screw 82 for compressing a brush spring 83.

The control system shown in Fig. 5 is essentially the same as that shown in Fig. 1. In this system, the detector element is a roll 14a whose position is determined by the length of the loop L of a strip S of material, such as photographic film, Cellophane, textile material, or the like, fed by the rolls 84, 85. Roll 84 is driven at constant or predetermined speed by prime mover 86, such as an electric motor connected in circuit with motor 2, which, through the variable speed transmission 3, drives the other sheet-feeding roll 85.

In systems of this character, it is desired that the peripheral speed of the rolls shall be the same, but due to conditions encountered in practice, the length of the loop between the rolls varies, requiring a temporary change in the speed of roll 85. It is necessary, however, in control of the speed of roll 85 to maintain the length of the loop L constant within reasonable limits and to avoid abrupt changes in speed harmful to the strip S.

Shaft 23 of the control switch 16 is suitably connected to the supporting frame 87 of the roll 14a, as by cord 15, drum 88 and the friction disk or gear 19a. Accordingly, as the loop L increases or decreases in length, the resulting downward or upward movement of the roll 14a effects rotation of shaft 23 of the control switch in one direction or the other.

When the roll is in a predetermined or neutral position, such as shown in Fig. 1, the control switch 16 is in its neutral position, for which there is no supply of current to the control motor 17 whose armature 40 is mechanically connected to the control screw 6 of the variable speed transmission 3. When, however, for any reason, the length of the loop L decreases, the roll 87 is raised, causing shaft 23 of the control switch to move to corresponding extent in a clockwise direction. This movement of the shaft effects engagement between contacts 32 and 34 and also moves the contact segment 26 on disk 25 in position to bridge the brushes 30, 31 of the control switch. Thus, there is completed a circuit through armature 40 and field 44 of motor 17 to effect rotation of the adjusting screw 6 of the variable speed transmission, causing the speed ratio to change in proper sense to decrease the peripheral speed of roll 85. In consequence, the decrease in length of the loop L is checked; eventually the loop L may lengthen, causing the roll 14a to move downwardly or in reverse direction. Almost immediately, at the initiation of this reverse movement, contact 32 of the control switch moves out of engagement with contact 34 to preclude any further change in the speed ratio of the variable speed transmission. Assuming no further immediate change in the length of the loop, the control system remains inactive with the control disk 25 displaced from its neutral position, and there is no reversal of the control motor 17 until the length of loop L increases to such extent that the disk 25 moves in reverse direction beyond the neutral position shown in Fig. 5. Conversely, if the parts are in the position shown in Fig. 5, and the loop L lengthens, the control disk 25 is moved in counterclockwise direction from the neutral position shown to effect flow of current through the field 38 of motor 17 to effect a change in the speed ratio of the variable speed transmission in proper sense to increase the speed of roll 85; the speed ratio is progressively changed until the downward movement of roll 14a is checked. Substantially immediately upon a reverse or upward movement of the roll, the contact 32 of the control switch moves out of engagement with contact 33 to deenergize the control motor 17.

So long as the disk 25 is displaced in counterclockwise direction from the neutral position of Fig. 1, the control system responds to effect change in the speed ratio only for downward movement of the detector roll 14a and does not effect a reverse operation of the control motor until the detector roll 14a, in moving upwardly, passes beyond the neutral position.

In systems of this general type, the desired speed of the web may vary, as between different installations or uses, as much as from 10 feet to 400 feet per minute, depending upon the material used, and the force available for operation of the control switch may be as small as a few ounces or as great as several hundred pounds, again depending upon the material used. The control system 5 is suitable, under these extreme conditions, to effect smooth change in the speed of roll 85 necessary to correct for variations in the length of loop L and is capable of maintaining the length of loop L constant within reasonably narrow limits without excessive hunting or overshooting of the control action.

Preferably, as appears in Fig. 5, the circuit of motor 17 is not maintained continuously when the control switch 16 is closed; there is interposed in the common lead 35 of the control switch an intermittently operating circuit controlling device 90; specifically, the motor 91, preferably energized concurrently with initiation of operation of the web-driving motors 2 and 86, drives the commutator device 92 consisting of the disks 93, 94, one of which supports a contact ring 95 continuously engaged by brush 96 and the other of which supports a contact segment 97 of suitable angular length and engaged by brush 98 for a fraction of a revolution of the disk 93.

The speed of rotation of the commutator disk and the angular length of segment 97 are chosen to suit the requirements of the particular installation; in general, they are so selected as to afford adjustment of the speed ratio of the variable speed transmission at such rate as to minimize a tendency for the control action to overshoot or hunt.

As appears from Fig. 6, the motor 91 and the commutating disks and brushes may be incorporated in a single unit with the control switch 16. The construction is similar to that shown in Fig. 2 except that between the cover 62 and the main or body member 63 there is interposed an additional cylindrical housing 99 for the motor 91 and the commutator device 92.

If, in the installation of the control system for a given purpose, it appears desirable to add the intermittent circuit controller 90, it is, therefore, a simple matter to effect conversion of the control switch of Fig. 2 to that of Fig. 6.

Preferably, as in the system of Fig. 1, push-buttons 44 and 45 are provided to permit adjustment by an operator of the speed-conversion ratio of the variable speed transmission; similarly, the power switch PS, for the web-driving motors 2 and 86, controlled by starting and stopping push-buttons 54, 57, is provided with contact 47 included in a supply conductor to the control circuit comprising switch 16, interrupter 92, and motors 17 and 91.

Referring to Figs. 7 and 8, there is illustrated a modified form of reversing switch for the control motor 17 of the variable-speed transmission 3. The cord 15, or equivalent, for transmitting motion of the detector element is connected to rod 25A, of insulating material, guided for rectilinear movement in the switch housing 100 of insulating material. Rod 25A passes through contact members 33A and 34A which define the limits of movement of contact member 32A which is a split sleeve frictionally held to rod 25A by springs 101 which encircle opposite ends of the sleeve elements 102, 103 and are received by recesses therein. Preferably, carbon rings 104, 105, loosely fitting the rod 25A, are interposed between contacts 33A, 32A and 34A. Either or both of fixed contacts 33A, 34A may be adjustable longitudinally of the tubular housing 100 by provision of suitable slots through which the terminals 106, 107 pass. The sleeve element 102 of movable contact 32A is provided with a terminal 108 extending freely through an elongated slot 109 in the housing 100.

As rod 25A moves downwardly from the position shown in Fig. 7, the circuit between contacts 32A and 33A is broken to deenergize motor 17; for further downward movement contact 32A engages contact 34A to effect reverse rotation of motor 17; for still further downward movement of rod 25A, contact 32A slips with respect thereto so that when rod 25A stops the displacement of contact 32A longitudinally of the rod 25A is substantially proportional to the movement of the detector element minus the original separation of contact 32A from contact disk 105 of contact 34A. Immediately upon reversal of movement of rod 25A, contact 32A separates from contact 34A to deenergize motor 17 and thus prevent any further change in the speed ratio of the variable speed transmission; there is no reversal of motor 17 until rod 25A moves upwardly sufficiently to effect contact between contacts 32A and 33A through the interposed arcing disk 104.

The limit switches 109, 110 are operable, respectively, by cams 111, 112 adjustably secured to rod 25A. Limit switch 109 is in shunt to the contacts 32A, 33A and limit switch 110 is in shunt to contacts 32A, 34A. These limit switches provide for continuous operation of motor 17, when the detector element is a substantial distance from its neutral position, by preventing contact 32A from interrupting energization of the motor immediately upon reversal of movement of the detector element toward its neutral position. For a restricted range of movement of the detector element about its neutral position, the limit switches are not operated and contact 32A provides for deenergization of the motor as soon as the detector element begins to return toward its neutral position.

Figures 9, 10:
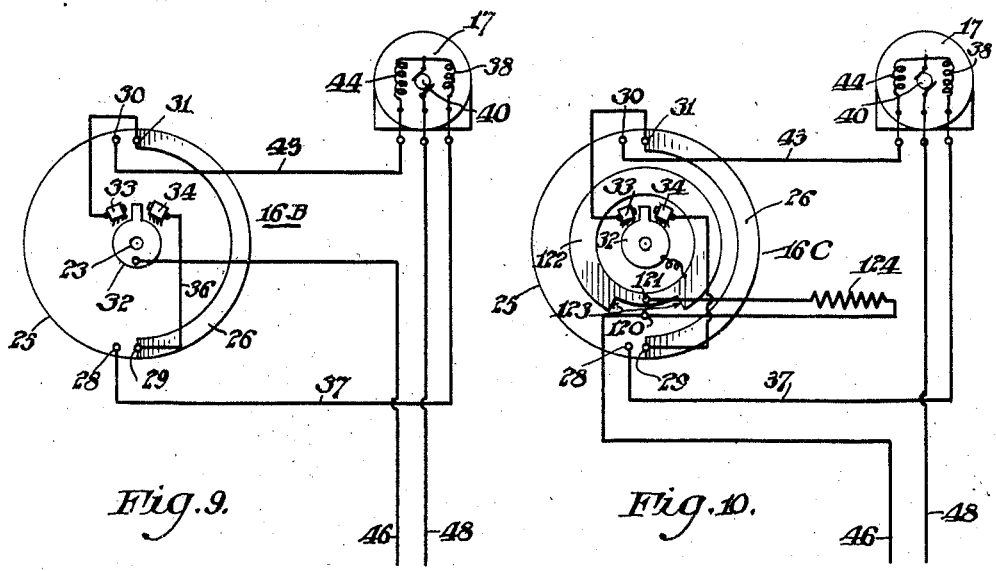

The control switch 16B, diagrammatically shown in Fig. 9, is the same as the control switch 16 of Figs. 1–4 except that contact segment 27 thereof is omitted and brushes 28 and 29 are repositioned to be bridged by contact segment 26 upon rotation of shaft 23 in clockwise direction from the neutral position shown in Fig. 9. Operation of the system is substantially the same as above described in connection with Figs. 1 and 5 in either of which switch 16 may be replaced by switch 16B without effect upon the character of the control action. Briefly, upon rotation of shaft 23 in clockwise direction from the position shown, a circuit is completed from line conductor 46, through contacts 32, 34, conductor 36, brush 29, segment 26, brush 28, conductor 37, and thence to line conductor 48 through the armature and one of the field windings 38 or 44 of motor 17. The angular displacement of disk 25 corresponds to movement of the detector element, not shown in this figure, whereas contact 32 moves with shaft 23 only for a short distance until arrested by contact 34, the slip clutch such as shown in Fig. 2 permitting relative movement of contact 34 and shaft 23 for continued clockwise rotation of the latter. Immediately upon reverse rotation of shaft 23, the motor is deenergized because of separation of contacts 32, 34 and for further reverse rotation contact 32 engages fixed contact 33 but their engagement is ineffective to cause energization of motor 17 until disk 25 passes through neutral position, whereupon contact segment 26 bridges brushes 30, 31 to effect reverse rotation of control motor 17.

Control switch 16C, diagrammatically shown in Fig. 10, is similar to control switch 16B of Fig. 9, differing in that it is provided with additional brushes 120, 121 adapted to be bridged by contact segment 122 on disk 25 when displaced in either direction from the neutral position shown in Fig. 10, beyond limits defined by the cut-out 123 in the contact segment 122. So long as movement of the disk is within those limits, the resistance 124 is in circuit with contact 32 for suitably reduced speed of rotation of motor 17; when disk 25 is displaced beyond either of those limits, the resistance 124 is short-circuited by bridging engagement of contact segment 122 with brushes 120, 121.

Using this type of control switch in the systems of Figs. 1 and 5, their operation is as previously described, with the additional feature that the rate of adjustment of control screw 6 of the variable speed-transmission 3 depends upon the extent of displacement of the detector element from neutral position.

Figures 11, 12:
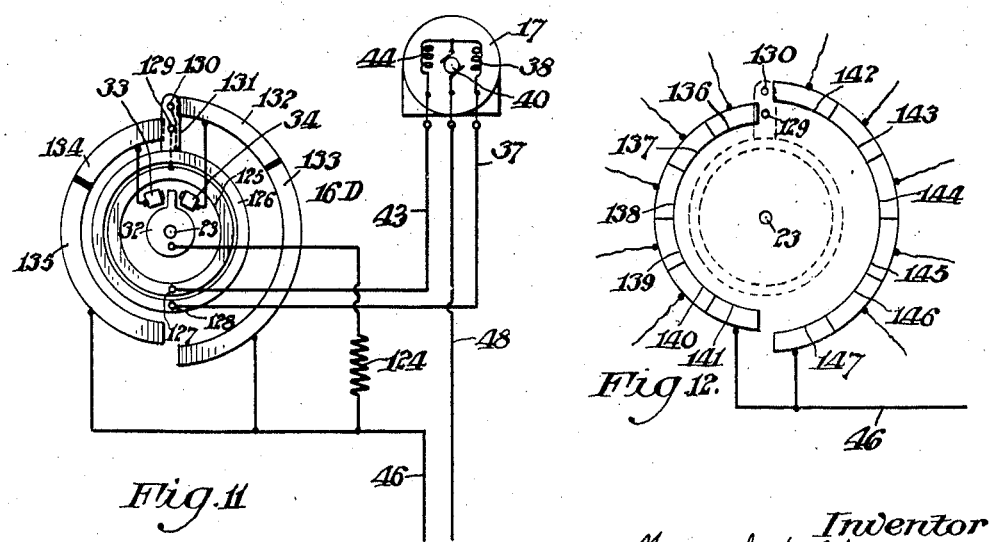

Control switch 16D, diagrammatically shown in Fig. 11, is also suited for use in the systems of Fig. 1 or Fig. 5; the disk 25 fixed to shaft 23 carries two slip rings 125, 126 engaged, respectively, by brushes 127, 128 and connected to brushes 129, 130 carried by arm 131 rotatable with disk 25. For displacement of shaft 23 in clockwise direction from the neutral position shown in Fig. 11, movable brush contact 130 is in engagement with stationary contact segment 132 unless the displacement is so great the brush is in engagement with stationary contact segment 133; for displacement of shaft 23 in counterclockwise direction from neutral, movable contact 129 engages either of the stationary contact segments 134, 135, depending upon the magnitude of the displacement.

For movement of arm 131 within the range defined by contact segments 132, 134, the control circuit includes switch 32, 33, 34, and the operation is the same as described in connection with switch 16 of Figs. 1 and 5, whereas, for movement of arm 31 beyond contact 132 or 134, the motor-circuit is completed regardless of the position of movable contact 32 which, as in prior modifications, has a slip connection to shaft 23. If desired, resistance 124 may be connected in circuit with contact 32 to provide for reduced speed of control motor 17 when the displacement of shaft 23 from neutral is not so great as to effect engagement of contact 129 or 130 with stationary contact segment 133 or 135.

In Fig. 12 is shown an arrangement of stationary contact segments suited for use in the control switch of Fig. 11 in lieu of segments 132—135. Segments 136—141 are disposed for successive engagement by brush 129 as shaft 23 rotates in counter-clockwise direction from neutral position and segments 142—147 are similarly disposed for successive engagement by brush 130 for clockwise displacement of shaft 23 from neutral. Two or more adjacent segments, such as 136, 137, 138, may be connected in effect to form contact segment 134 of Fig. 11 and the remainder of the series may be connected in effect to form contact segment 135 of Fig. 11. Similarly, any two or more of segments 142—147 may be connected to, in effect, form contact segment 132 of Fig. 11 and the remainder of the series utilized as contact 133 of Fig. 11. Alternatively, all or some, or the adjacent segments of either of both groups may be connected through resistors of suitable magnitude to provide for greater and greater speed of motor 17 for increased displacement of arm 131 from neutral position.

In the modifications of Figs. 11 and 12, the sense in which the control motor 17 may be energized depends upon the sense of displacement of shaft 23 from neutral position; whether or not the motor 17 is energized under such circumstance depends upon other conditions; if shaft 23 is moving away from neutral position, the motor 17 is energized; if shaft 23 is moving toward neutral position, the motor 17 is not energized unless the displacement is sufficiently great to effect engagement of contact 129 or 130 with contact segment 135 or 133, in which event action of switch 32, 33, 34 is suspended until the displacement is sufficiently reduced, as above described. The speed at which motor 17 effects its control action, when energized, depends upon the displacement of arm 131 from neutral position at the time the motor circuit is completed; whether or not, during a control period, the speed remains the same, increases, or decreases depends upon the extent and direction of the movement of arm 131 during the control period.

While I have illustrated and described preferred arrangements and methods, it is to be understood my invention is not limited thereto but is coextensive in scope with the appended claims.

What I claim is:

1. In a control system for a variable speed transmission including a driving member, a member driven thereby, and means adjustable to vary the speed ratio of said members and comprising a detector element movable in response to change in speed of said driven member, and a reversible motor for actuating said adjustable means, a reversing switch for said motor comprising contact structure reversing its circuit-controlling position as said detector element passes through a neutral position, and other contact structure reversing its circuit-controlling position upon reversal of movement of said detector element.

2. In a control system for a variable speed transmission including a driving member, a member driven thereby, and means adjustable to vary the speed ratio of said members and comprising a detector element movable in response to change in speed of said driven member, and a reversible motor for actuating said adjustable means, reversing means for said motor actuated in response to movement of said detector element comprising a switch closed when said detector element is displaced in one direction from a neutral position, a switch closed when said detector element is displaced in opposite sense from neutral position, and a switch whose circuit-controlling position is reversed upon reversal in direction of the movement of said element.

3. In a control system for a variable speed transmission including a driving member, a member driven thereby, and means adjustable to vary the speed ratio of said members and comprising a detector element movable in response to change in speed of said driven member, and a reversible motor for actuating said adjustable means, a reversing switch for said motor comprising contact structure reversing its circuit-controlling position as said member passes through a neutral position, and other contact structure reversing its circuit-controlling position upon reversal of movement of said detector element, and intermittently acting circuit-interrupting means in circuit with said motor and said reversing switch.

4. In a control system for a variable speed transmission including a driving member, a member driven thereby, and means adjustable to vary the speed ratio of said members and comprising a detector element movable in response to change in speed of said driven member, and a reversible motor for actuating said adjustable means, a reversing switch for said motor comprising structure mechanically connected to said detector element for movement in unison therewith throughout its range of movement, and contact structure frictionally held to said first-named structure for movement therewith in a restricted fixed range.

5. In a control system for a variable speed transmission including a driving member, a member driven thereby, and means adjustable to vary the speed ratio of said members and comprising a detector element movable in response to change in speed of said driven member, and a reversible motor for actuating said adjustable means, a reversing switch for said motor comprising structure rotated by said detector element to extent substantially proportional to movements of said detector element, contact means carried by said rotatable structure, fixed contact means selectively engaged by said contact means in accordance with the sense of displacement of said detector element from a neutral position, movable contact structure, closely spaced stationary butt contacts in circuit with said contact means and selectively engaged by said contact structure for movement thereof in opposite directions, and means providing a slip connection between said rotatable structure and said movable contact structure to permit relative angular movement between said structures upon engagement of said movable contact structure with either of said butt contacts.

6. In a control system for a variable speed transmission including a driving member, a member driven thereby, and means adjustable to vary the speed ratio of said members and comprising a detector element movable in response to change in speed of said driven member, and a reversible electric motor for actuating said adjustable means, a reversing switch in circuit with said motor comprising contact structure movable in unison with said detector element, a second switch comprising contact structure having a slip connection to said detector element, and electrical connections between fixed contacts of said switches providing for operation of said motor in one direction or the other depending upon the sense of displacement of said element from its neutral position and for de-energization of said motor upon movement of said detector element toward its neutral position.

7. In a control system for a variable speed transmission including a driving member, a member driven thereby, and means adjustable to vary the speed ratio of said members and comprising a detector element movable in response to change in speed of said driven member, and a reversible electric motor for actuating said adjustable means, a reversing switch in circuit with said motor comprising contact structure movable in unison with said detector element, a second switch comprising contact structure having a clip connection to said detector element, electrical connections between fixed contacts of said switches providing for operation of said motor in one direction or the other depending upon the sense of displacement of said element from its neutral position and for de-energization of said motor upon movement of said detector element toward its neutral position, manually operable switching means for effecting operation of said motor in either direction, and means for preventing control of the operation of said motor by said reversing switch and said second switch during actuation of said manually operable switch means.

8. In a control system for a variable speed transmission including a driving member, a member driven thereby, and means adjustable to vary the speed ratio of said members and comprising a detector element movable in response to change in speed of said driven member, and a reversible electric motor for actuating said adjustable means, means for controlling the operation of said motor comprising contact structure movable with said detector element, a pair of fixed contacts bridged by said contact structure upon displacement of said detector element in one sense from its neutral position partially to complete a circuit which controls operation of said motor in one direction, a second pair of fixed contacts bridged by said contact structure upon displacement of said detector element in reverse sense from its neutral position partially to complete a circuit controlling reverse operation of said motor, and a switch having contacts connected respectively to fixed contacts of said first and second named pairs of contacts and including a member having a slip connection to said detector element to effect completion of one or the other of said motor-control circuits except when said detector element is moving toward its neutral position.

9. In a control system for a variable speed transmission including a driving member, a member driven thereby, and means adjustable to vary the speed ratio of said members and comprising a detector element movable in response to change in speed of said driven member, and a reversible electric motor for actuating said adjustable means, means for controlling the energization of said motor comprising two switches including a structure movable with said detector element to close one or the other of said switches depending upon the sense of displacement of said detector element from neutral position, and a switch including a member having a slip connection to said detector element electrically connected to one or the other of said first named switches in accordance with the direction of movement of said detector element and irrespective of the sense of displacement of said member from neutral position.

10. In a control system for a variable speed transmission including a driving member, a member driven thereby, and means adjustable to vary the speed ratio of said members and comprising a detector element movable in response to change in speed of said driven member, a reversible split-field motor for actuating said adjustable means, and a source of current, means for controlling the operation of said motor comprising two switches in circuit respectively with the field windings of said motor, structure movable with said detector element for selectively closing one or the other of said switches dependent upon the sense of displacement of said detector element from neutral position, and a switch including a member having a slip connection to said detector element for connecting said source of current to said motor through one or the other of said first named switches in accordance with the direction of movement of said element and irrespective of the sense of its displacement from neutral position.

11. In a control system for a variable speed transmission including a driving member, a member driven thereby, and means adjustable to vary the speed ratio of said members and comprising a detector element movable in response to change in speed of said driven member, and a reversible electric motor for actuating said adjustable means, a reversing switch in circuit with said motor comprising rotatable contact structure movable in unison with said detector element, a second switch comprising structure rotatable about the same axis as said rotatable contact structure and having a slip connection thereto, and electrical connections between fixed contacts of said switches providing for energization of said motor during movement of said detector element from its neutral position and in a sense dependent upon the sense of displacement of said element from neutral position and for deenergization of said motor upon movement of said detector element toward neutral position.

12. In a control system for a variable speed transmission including a driving member, a member driven thereby, and means adjustable to vary the speed ratio of said members and comprising a detector element movable in response to change in speed of said driven member, and a motor for actuating said adjustable means, two control circuits for controlling adjustment of said adjustable means in opposite directions, each of said control circuits including stationary contacts engageable by serially-connected movable contacts, one of said movable contacts moving in unison with said detector element and the other of said movable contacts having a slip connection to said detector element.

13. In a control system for a variable speed transmission including a driving member, a member driven thereby, and means adjustable to vary the speed ratio of said members and comprising a detector element movable in response to change in speed of said driven member, reversible motive means for actuating said adjustable means, and a source of energy for said motive means, means for controlling the energization of said motive means comprising two control devices connected in series between said motive means and said source and so mechanically coupled to said detector element that upon movement of said detector element in either direction away from its neutral position said motive means is energized in a sense dependent upon the direction of movement of said devices and that upon movement of said detector element in either direction toward its neutral position energization of said motive means is interrupted.

14. In an electrical control system for a reversible motor, a control member movable in either direction from a neutral position, contact structure movable in unison with said member throughout its range of movement and for both directions of movement thereof, contact structure having a slip connection with said member providing for its limited movement with said member between positions corresponding respectively with opposite directions of movement of said member with respect to its neutral position, and circuit connections to said motor and to said contact structures providing for operation of said motor in a sense always determined by the sense of displacement of said first contact structure from the position corresponding with said neutral position of said member but only so long as said second named contact structure is in position enforced by continued movement of said member away from said neutral position.

15. In an electrical control system for a reversible electric motor, a control member movable in either direction from a neutral position, contact structure movable with said member throughout its range of movement and for both directions of its movement, contact structure having a slip connection to said member for limited movement therewith upon reversal of movement of said member anywhere within said range of its movement, said contact structures effecting energization of said motor, upon movement of said member from its neutral position, in sense determined by the sense of displacement of said member from its neutral position and said second named contact structure effecting deenergization of said motor upon reversal of movement of said member irrespective of its displacement.

16. In an electrical control system for a reversible motor, a contact-operating member movable in either direction from a neutral position, contact structure movable in unison with said member in both directions and throughout its range of movement, contact structure having a slip connection with said member for movement therewith to limited extent upon reversal of movement of said member, said movable contact structures, within part of the range of movement of said member, effecting energization of said motor in accordance with the sense of displacement of said member from neutral position but only so long as said member is moving away from neutral position, and contact structure effective upon displacement of said member beyond said part of its range of movement to effect energization of said motor in accordance with the sense of displacement of said member from neutral and irrespective of whether its movement is toward or from neutral position.

17. In an electrical control system for a reversible electric motor, a control member movable in either direction from a neutral position, and means for effecting operation of said motor always in accordance with the sense of displacement of said member from neutral position but only so long as said member is moving away from neutral position or is substantially displaced from neutral position comprising contact structure movable in unison with said member throughout its range of movement, contact structure having a slip connection with said member for movement therewith to limited extent upon reversal of movement of said member, and contact structure engaged by said first contact structure only when said member is substantially displaced from its neutral position.

FREDERICK W. ATZ, JR.

CERTIFICATE OF CORRECTION.

Patent No. 2,139,482.   December 6, 1938.

FREDERICK W. ATZ, JR.

It is hereby certified that error appears in the printed specification of the above numbered patent requiring correction as follows: Page 1, first column, line 21, for the word "radio" read ratio; page 5, second column, line 46, for "or" second occurrence, read of; line 47, for "of" read or; page 6, second column, line 43, claim 7, for "clip" read slip; and that the said Letters Patent should be read with this correction therein that the same may conform to the record of the case in the Patent Office.

Signed and sealed this 23rd day of May, A. D. 1939.

Henry Van Arsdale (Seal)   Acting Commissioner of Patents.